US012800888B2

(12) United States Patent
Nakano

(10) Patent No.: US 12,800,888 B2
(45) Date of Patent: Nov. 17, 2026

(54) OPTICAL SYSTEM, IMAGING SYSTEM INCLUDING THE SAME, AND MOVABLE APPARATUS

(71) Applicant: CANON KABUSHIKI KAISHA, Tokyo (JP)

(72) Inventor: Masatsugu Nakano, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 195 days.

(21) Appl. No.: 18/401,000

(22) Filed: Dec. 29, 2023

(65) Prior Publication Data

US 2024/0231058 A1 Jul. 11, 2024

(30) Foreign Application Priority Data

Jan. 6, 2023 (JP) ................................ 2023-001100

(51) Int. Cl.
*G02B 9/64* (2006.01)
*G02B 13/18* (2006.01)

(52) U.S. Cl.
CPC ............... *G02B 13/18* (2013.01); *G02B 9/64* (2013.01)

(58) Field of Classification Search
CPC ................ G02B 13/00; G02B 13/0045; G02B 13/0055; G02B 13/0035; G02B 13/0015; G02B 13/04; G02B 13/06; G02B 13/16; G02B 13/18; G02B 13/006; G02B 5/20; G02B 5/208; G02B 9/12; G02B 9/64; G02B 3/02
USPC ........ 359/754, 708, 713, 714, 750, 751, 755
See application file for complete search history.

(56) References Cited

U.S. PATENT DOCUMENTS

| | | | | |
|---|---|---|---|---|
| 6,943,958 | B2 * | 9/2005 | Ozaki | G02B 15/1425 359/691 |
| 8,134,787 | B2 | 3/2012 | Saitoh | |
| 9,195,033 | B2 * | 11/2015 | Sasaya | G02B 13/0085 |
| 10,203,487 | B2 | 2/2019 | Minefuji | |

FOREIGN PATENT DOCUMENTS

| | | |
|---|---|---|
| JP | 2000221391 A | 8/2000 |
| JP | 2009063877 A | 3/2009 |
| JP | 2017102353 A | 6/2017 |
| JP | 2018084598 A | 5/2018 |
| JP | 2019517685 A | 6/2019 |
| JP | 2020522751 A | 7/2020 |
| JP | 2023163268 A | 1/2023 |

(Continued)

OTHER PUBLICATIONS

English translation of WO-2017213109. (Year: 2017).*

*Primary Examiner* — Jie Lei
(74) *Attorney, Agent, or Firm* — Canon U.S.A., Inc. IP Division

(57) ABSTRACT

An optical system includes a plurality of lenses, and an aperture diaphragm, wherein in a case where an amount of increase in an image height per unit angle of view is set as a resolution, a resolution of the optical system is lower than a resolution of a stereographic projection optical system at a central angle of view, and the resolution of the optical system is higher than the resolution of the stereographic projection optical system at a maximum half angle of view and at an intermediate half angle of view, which is a half value of the maximum half angle of view.

20 Claims, 11 Drawing Sheets

(56) References Cited

FOREIGN PATENT DOCUMENTS

| | | | | | |
|---|---|---|---|---|---|
| WO | WO-2017213109 | A1 | * | 12/2017 | ............. G02B 13/04 |
| WO | 2019235498 | A | | 12/2019 | |
| WO | 2023276819 | A1 | | 1/2023 | |

* cited by examiner

OPTICAL SYSTEM, IMAGING SYSTEM INCLUDING THE SAME, AND MOVABLE APPARATUS

BACKGROUND

Field of the Disclosure

The present disclosure relates to an optical system, and is suitable for imaging apparatuses, such as a digital still camera, a digital video camera, an in-vehicle camera, a camera for a mobile phone, a monitoring camera, a wearable camera, and a camera for medical use, imaging systems and movable apparatuses.

Description of the Related Art

An optical system used for an imaging apparatus, such as an in-vehicle camera, is required to have a wide angle of view. Japanese Patent Application Laid-Open Nos. 2009-063877 and 2018-84598 discuss as an optical system with a wide angle of view a stereographic projection optical system in which an image-forming magnification in a peripheral area is larger than that in a central area.

For example, if an in-vehicle camera is installed on a side of a movable apparatus and an acquired image is displayed on a display unit such as an electronic mirror (digital mirror, e-mirror), it is required to acquire the image with a sufficiently high resolution in a wide range from an intermediate image height to an outermost off-axis image height. However, it is difficult for the optical system discussed in Japanese Patent Application Laid-Open Nos. 2009-063877 and 2018-84598 to achieve a sufficiently high resolution in the range from the intermediate image height to the outermost off-axis image height.

SUMMARY

According to an aspect of the present disclosure, an optical system includes a plurality of lenses, and an aperture diaphragm, wherein in a case where an amount of increase in an image height per unit angle of view is set as a resolution, a resolution of the optical system is lower than a resolution of a stereographic projection optical system at a central angle of view, and the resolution of the optical system is higher than the resolution of the stereographic projection optical system at a maximum half angle of view and at an intermediate half angle of view, which is a half value of the maximum half angle of view.

Further features of various embodiments will become apparent from the following description of exemplary embodiments with reference to the attached drawings.

DESCRIPTION OF THE EMBODIMENTS

Figure 1:
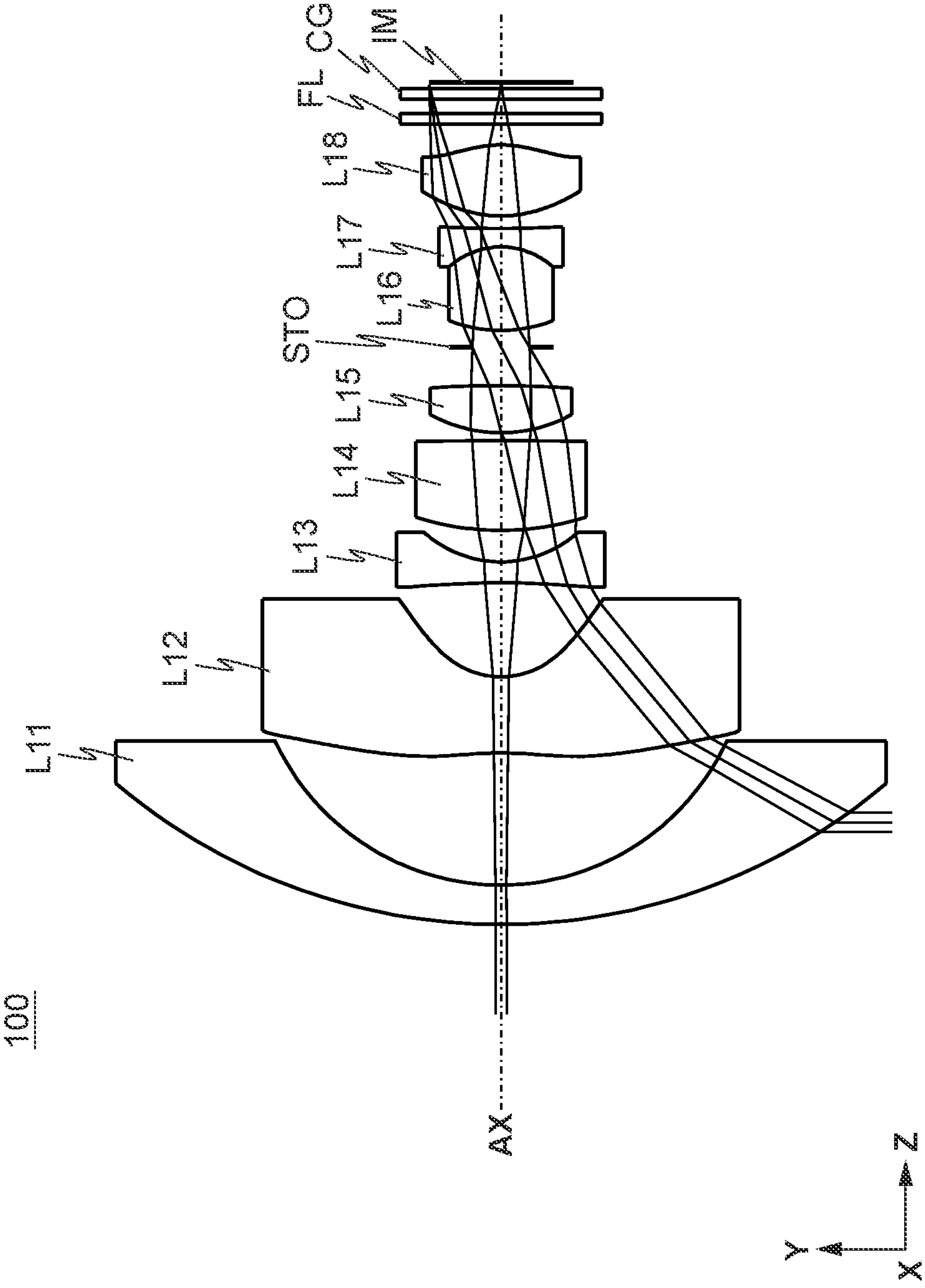
FIG. 1 is a schematic diagram illustrating a principal part of an optical system according to a first exemplary embodiment.

Exemplary embodiments of the present disclosure will be described below with reference to the drawings. In the drawings, there may be cases where a reduced scale is different from an actual reduced scale for descriptive purposes. In the drawings, the same members are denoted by the same reference numerals and redundant descriptions are omitted.

Figure 3:
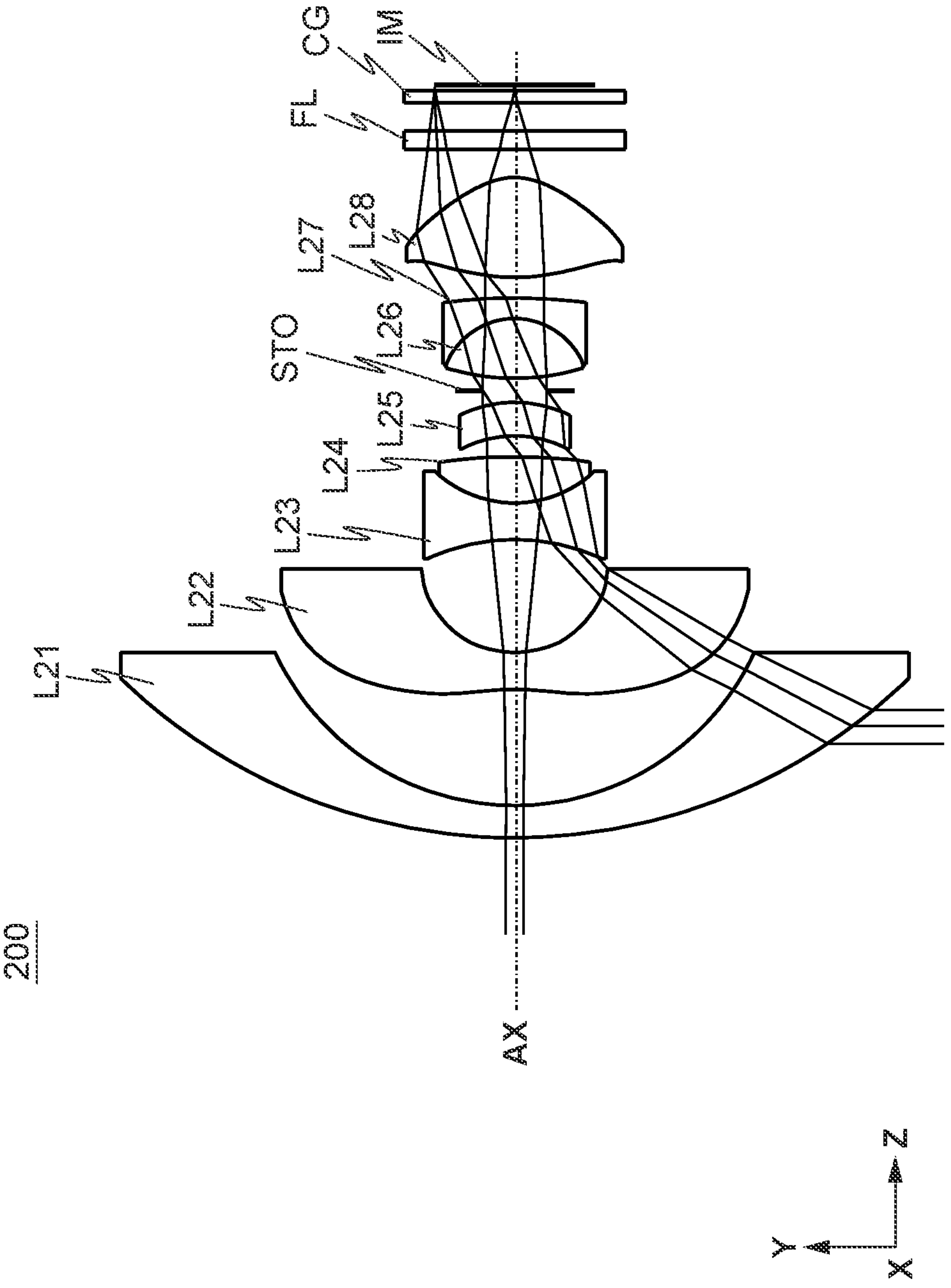
FIG. 3 is a schematic diagram illustrating a principal part of an optical system according to a second exemplary embodiment.
Figure 5:
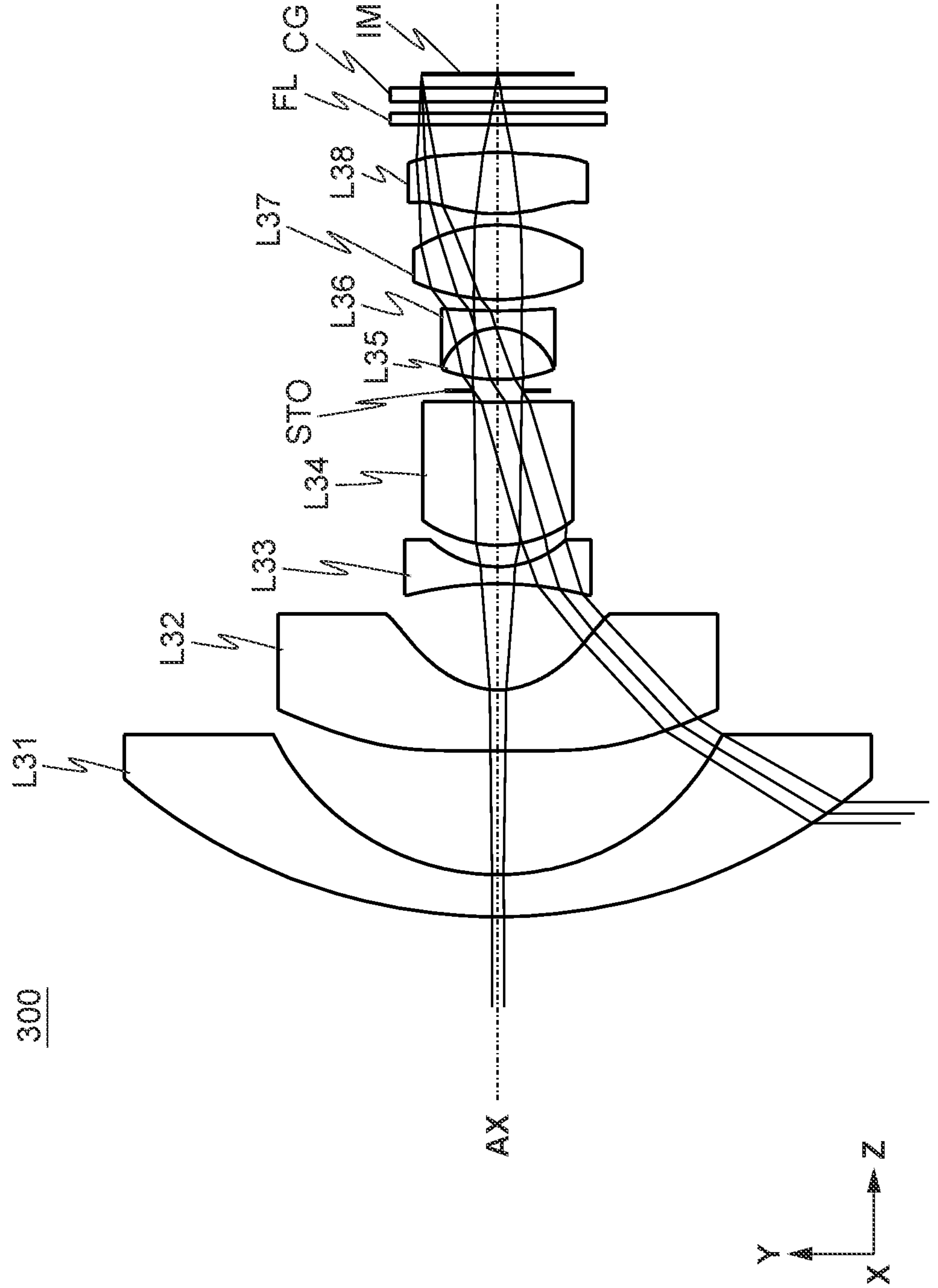
FIG. 5 is a schematic diagram illustrating a principal part of an optical system according to a third exemplary embodiment.

FIGS. 1, 3, and 5 are schematic diagrams illustrating principal parts of an optical system 100 according to a first exemplary embodiment, an optical system 200 according to a second exemplary embodiment, and an optical system 300 according to a third exemplary embodiment, respectively, taken along a section (YZ section) including an optical axis AX of each optical system. In FIGS. 1, 3, and 5, −Z-side corresponds to an object side (magnification conjugate side) and +Z-side corresponds to an image side (reduction conjugate side). The optical systems 100, 200, and 300 according to the first, second, and third exemplary embodiments are imaging optical systems used for an imaging apparatus, and an imaging plane of an image sensor is located at a position of an image plane IM. FIGS. 1, 3, and 5 illustrate a marginal ray of an on-axis light flux directed to an on-axis image height and a principal ray and a marginal ray of an outermost off-axis light flux directed to an outermost off-axis image height. The principal ray of the on-axis light flux overlaps the optical axis AX, and thus the illustration thereof is omitted. The optical systems 100, 200, and 300 according to the first, second, and third exemplary embodiments may be used as a projection optical system in a projection apparatus such as a projector. In this case, a display surface of a display device, such as a liquid crystal panel, is located at a position of the image plane IM.

Figure 2:
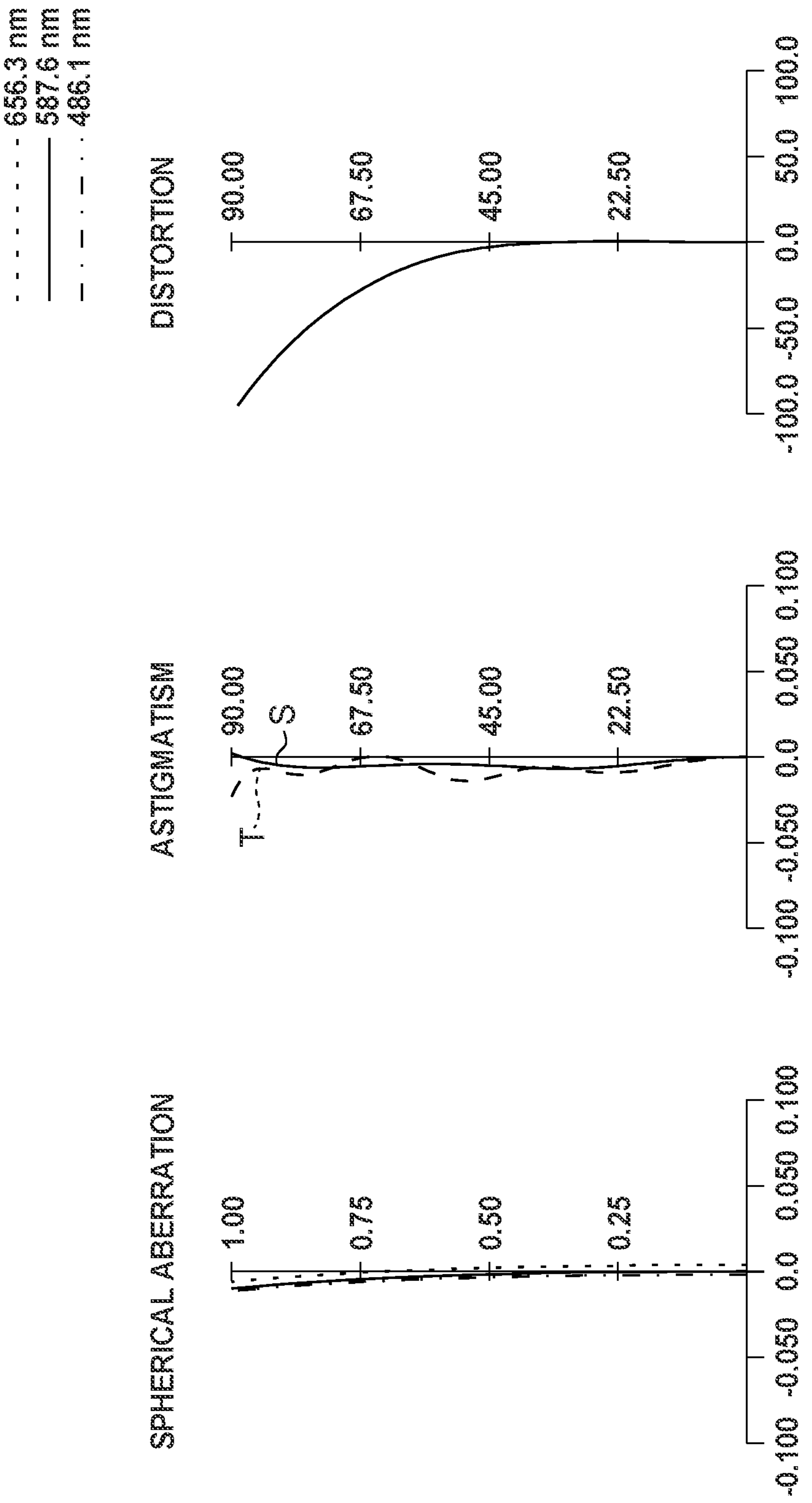
FIG. 2 illustrates various aberrations of the optical system according to the first exemplary embodiment upon focusing on an object at infinity.
Figure 4:
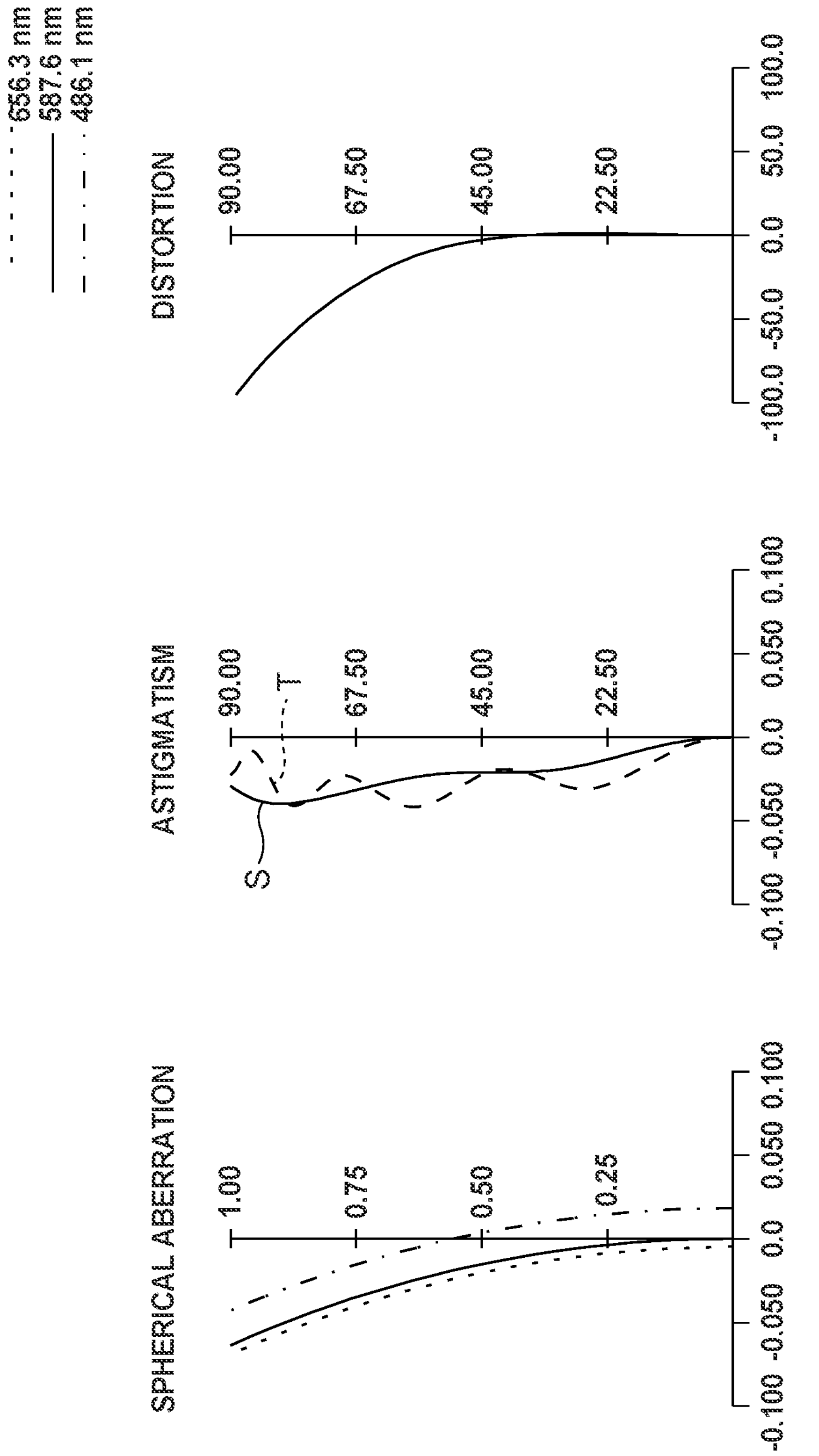
FIG. 4 illustrates various aberrations of the optical system according to the second exemplary embodiment upon focusing on an object at infinity.
Figure 6:
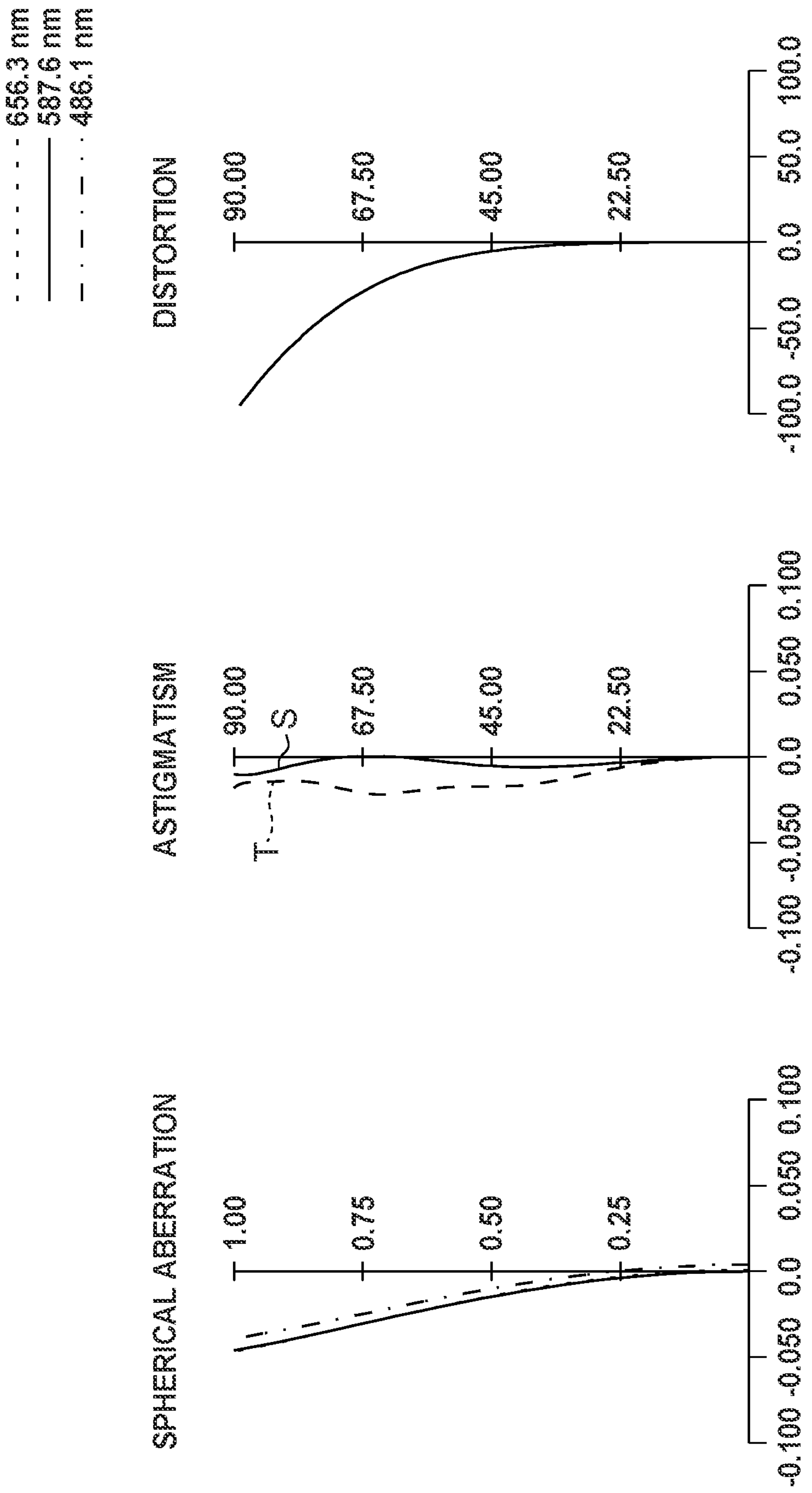
FIG. 6 illustrates various aberrations of the optical system according to the third exemplary embodiment upon focusing on an object at infinity.

FIGS. 2, 4, and 6 are longitudinal aberration diagrams of the optical system 100 according to the first exemplary embodiment, the optical system 200 according to the second exemplary embodiment, and the optical system 300 according to the third exemplary embodiment, respectively, upon focusing on an object at infinity. In each exemplary embodiment, it is assumed that a wavelength band of 400 nm to 700 nm (wavelength band for aberration correction) is used.

The longitudinal aberration diagrams illustrate a spherical aberration, a field curvature (astigmatism), and a distortion in this order from the left side. In each longitudinal aberration diagram, an aberration at 656.3 nm (C-line), an aberration at 587.6 nm (d-line), and an aberration at 486.1 nm (F-line) are represented by respective different lines. In the astigmatism diagram, T represents a meridional image plane, and S represents a sagittal image plane.

Next, features of the optical systems 100, 200, and 300 according to the first, second, and third exemplary embodiments will be described in detail.

The optical systems 100, 200, and 300 according to the first, second, and third exemplary embodiments each include a plurality of lenses and an aperture diaphragm STO. A cover glass CG and an optical filter FL that are located on the object side of the image plane IM are optical elements (flat plates) that do not contribute to image formation of each optical system, and thus are not necessarily included in each optical system. For example, the cover glass CG may be provided on the image sensor. An infrared radiation (IR) cut filter or the like can be adopted as the optical filter FL, and the optical filter FL may be used in substitution for the cover glass CG. The number of lenses, the location of each lens, and the location of the aperture diaphragm STO are not limited to those in the configuration according to each exemplary embodiment. The effects of the present disclosure can be obtained as long as the inequalities to be described below are satisfied.

In the optical systems 100, 200, and 300 according to the first, second, and third exemplary embodiments, assume that a projection characteristic indicating a relationship between a half angle of view θ [deg.] and an image height Y [mm] is represented by Y(θ), an amount of change in image height per unit angle of view (for a half angle of view θ per unit) is represented by δY(θ) [mm/deg.], and a maximum half angle of view is represented by θmax [deg.]. In this case, the maximum half angle of view θmax is the angle of view corresponding to the radius of an image circle (effective image circle) that is an area where an image is formed by each optical system. If each optical system is applied to an imaging apparatus, the angle formed between the principal ray of the outermost off-axis light flux directed to the outermost off-axis image height (maximum image height) on the imaging plane of the image sensor and the optical axis AX on a lens surface closest to the object side in each optical system corresponds to the maximum half angle of view θmax. When the unit angle of view δθ=π/180 holds, the amount of change in image height δY(θ) is represented as δY(θ)=Y(θ)−Y(θ−δθ).

An optical system employing a stereographic projection method (a stereographic projection optical system) will now be described as a comparative example to explain the resolution characteristics of the optical systems 100, 200, and 300 according to the first, second, and third exemplary embodiments. The term "resolution" used herein refers to an amount of increase [mm/deg.] in the image height Y per unit angle of view. If the optical systems 100, 200, and 300 according to the first, second, and third exemplary embodiments are applied to an imaging apparatus, the resolution of each optical system corresponds to the number of pixels of the image sensor per unit angle of view. In other words, the sum of the resolutions at all angles of view is constant regardless of the projection characteristics of each optical system. Accordingly, if the resolution at any one of the half angles of view is increased (decreased), the resolutions at the other half angles of view inevitably increase (decrease). A projection characteristic Ys(θ) of the stereographic projection optical system is represented as Ys(θ)=2fs×tan(θ/2) where fs represents a focal length. When the differential value of the projection characteristic Ys(θ) is represented by Ys'(θ), g(θ) represented as g(θ)=Ys'(θ)×δθ/δY(θ) is defined as a resolution ratio characteristic of each of the optical systems 100, 200, and 300 according to the first, second, and third exemplary embodiments.

The resolution ratio characteristic g(θ) corresponds to the value of the ratio of the amount of change in the image height of the stereographic projection optical system to the amount of change in the image height of each of the optical systems 100, 200, and 300 according to the first, second, and third exemplary embodiments. In other words, an increase or decrease in the value of the resolution ratio characteristic g(θ) represents an increase or decrease in the resolution of each of the optical systems 100, 200, and 300 according to the first, second, and third exemplary embodiments with respect to the resolution of the stereographic projection optical system at the half angle of view θ. The focal length of the stereographic projection optical system is represented as fs=Ys(θmax)/2 tan(θmax/2), and the differential value of the projection characteristic Ys(θ) is represented as Ys'(θ) =fs/cos$^2$(θ/2). Accordingly, the above-described resolution ratio characteristic g(θ) can be transformed according to equation (1).

$$g(\theta) = \frac{\pi Y(\theta\max)}{360 \cdot \tan\left(\frac{\theta\max}{2}\right) \cdot \cos^2\left(\frac{\theta}{2}\right) \cdot \delta Y(\theta)} \tag{1}$$

In this case, the resolution ratio characteristic g(0) at the half angle of view of 0° (central angle of view) of the optical systems 100, 200, and 300 according to the first, second, and third exemplary embodiments is greater than 1.0. This indicates that the resolution of each of the optical systems 100, 200, and 300 according to the first, second, and third exemplary embodiments at the central angle of view is lower than the resolution of the stereographic projection optical system. On the other hand, the resolution ratio characteristic g(θmax) at the maximum half angle of view θmax and a resolution ratio characteristic g(θmax/2) at an intermediate half angle of view θmax/2 that is a half value of the maximum half angle of view in each of the optical systems 100, 200, and 300 according to the first, second, and third exemplary embodiments are smaller than 1.0. This indicates that the resolution of each of the optical systems 100, 200, and 300 according to the first, second, and third exemplary embodiments is higher than the resolution of the stereographic projection optical system at the maximum half angle of view and at the intermediate half angle of view. Thus, the optical systems 100, 200, and 300 according to the first, second, and third exemplary embodiments can provide a user with an image with high visibility by increasing the resolution at the intermediate image height and at the outermost off-axis image height instead of risking the resolution at the central angle of view.

The optical systems 100, 200, and 300 according to the first, second, and third exemplary embodiments may desirably satisfy the following inequalities (1) to (3).

$$1.0 < g(0) < 2.0 \tag{1}$$

$$0.5 < g(\theta\max/2) < 1.0 \tag{2}$$

$$0.5 < g(\theta\max) < 1.0 \tag{3}$$

If the resolution ratio characteristic is less than the lower limit of the inequality (1), the resolution of each of the optical systems 100, 200, and 300 according to the first, second, and third exemplary embodiments at the on-axis image height corresponding to the central angle of view is higher than the resolution of the stereographic projection optical system. However, this makes it difficult to obtain a sufficiently high resolution for each of the optical systems 100, 200, and 300 according to the first, second, and third exemplary embodiments in the range from the intermediate image height corresponding to the intermediate half angle of view to the outermost off-axis image height corresponding to the maximum half angle of view. If the resolution ratio characteristic is more than the upper limit of the inequalities (2) and (3), the resolution of each of the optical systems 100, 200, and 300 according to the first, second, and third exemplary embodiments in the range from the intermediate image height to the outermost off-axis image height is lower than the resolution of the stereographic projection optical system. Accordingly, the difference between the resolution in a central area of an image and the resolution in a peripheral area of the image decreases, which makes it difficult to obtain an image with high visibility. On the other hand, if the resolution ratio characteristic is more than the upper limit of the inequality (1), it is difficult to suitably correct various aberrations such as field curvature, and thus this is not preferable. The same holds true if the resolution ratio characteristic is less than the lower limit of the inequalities (2) and (3).

Further, the following inequalities (1a) to (3a) may be desirably satisfied, and the following inequalities (1b) to (3b) may be more desirably satisfied.

$$1.1 < g(0) < 1.8 \quad (1a)$$

$$0.60 < g(\theta max/2) < 0.99 \quad (2a)$$

$$0.60 < g(\theta max) < 0.99 \quad (3a)$$

$$1.2 < g(0) < 1.6 \quad (1b)$$

$$0.70 < g(\theta max/2) < 0.98 \quad (2b)$$

$$0.70 < g(\theta max) < 0.98 \quad (3b)$$

Figure 7:
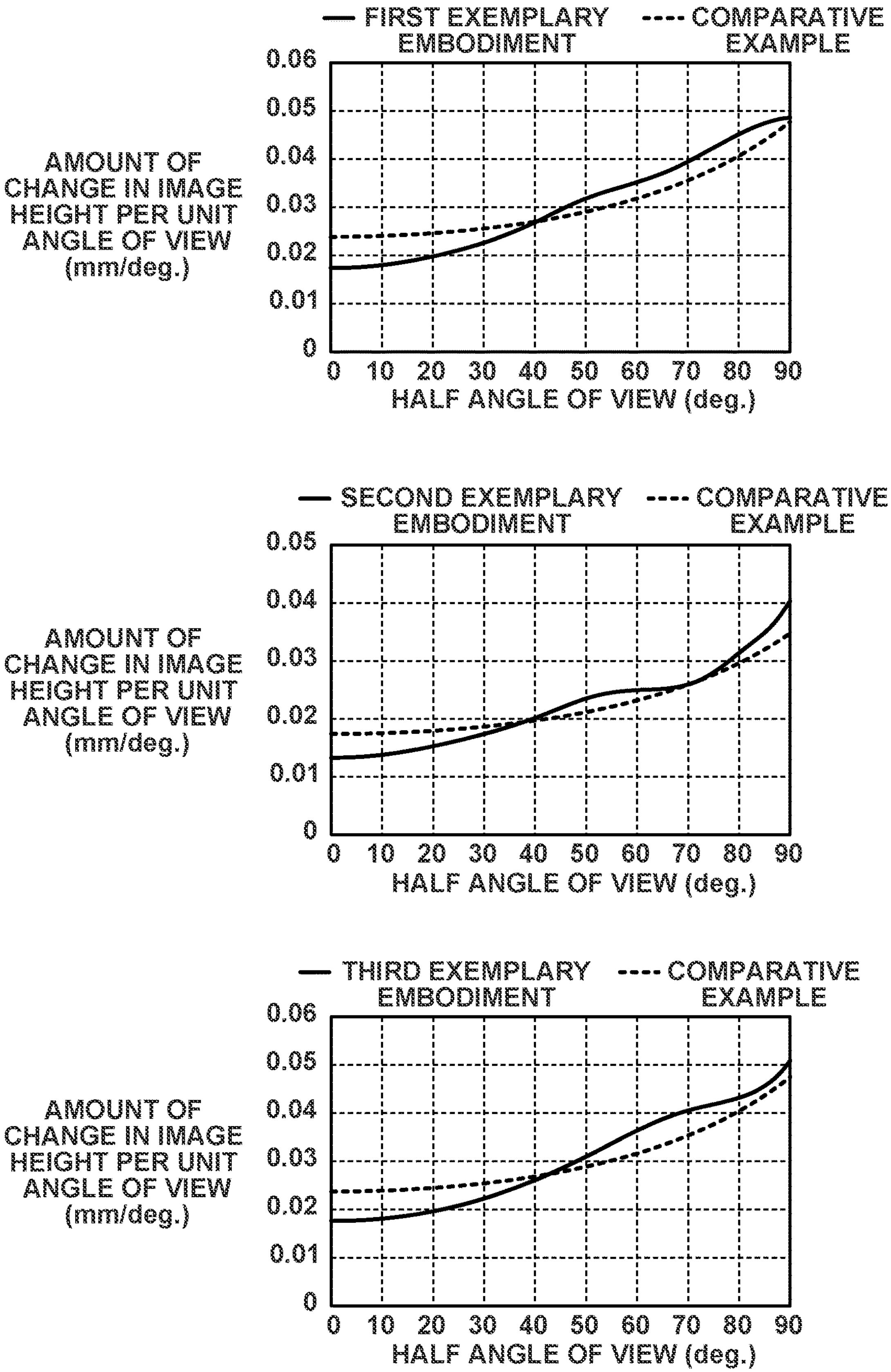
FIG. 7 illustrates a relationship between an angle of view and an amount of change in image height of the optical systems according to first to third exemplary embodiments.

FIG. 7 illustrates the relationship (resolution characteristics) between the half angle of view θ and the amount of change in image height δY(θ) of the optical systems 100, 200, and 300 according to the first, second, and third exemplary embodiments. In FIG. 7, the vertical axis represents the amount of change in image height δY(θ) per unit angle of view, and the horizontal axis represents the half angle of view θ. In FIG. 7, the graphs corresponding to the optical systems 100, 200, and 300 according to the first, second, and third exemplary embodiments are indicated by a solid line, and the graph corresponding to the stereographic projection optical system as the comparative example is indicated by a dashed line. The value of the maximum half angle of view θmax of each of the optical systems 100, 200, and 300 according to the first, second, and third exemplary embodiments and the optical system according to the comparative example is 90°. The above-described resolution ratio characteristic g(θ) corresponds to the ratio of the graph (dashed line) corresponding to the stereographic projection optical system to the graph (solid line) corresponding to the optical systems 100, 200, and 300 according to the first, second, and third exemplary embodiments.

As illustrated in FIG. 7, the amount of change in image height δY(θ) of each of the optical systems 100, 200, and 300 according to the first, second, and third exemplary embodiments is lower than that of the stereographic projection optical system at the central angle of view (θ=0). This indicates that 1.0<g(θ) holds, that is, the resolution of each of the optical systems 100, 200, and 300 according to the first, second, and third exemplary embodiments at the central angle of view is lower than the resolution of the stereographic projection optical system. On the other hand, the amount of change in image height δY(θ) of each of the optical systems 100, 200, and 300 according to the first, second, and third exemplary embodiments at the intermediate half angle of view (θmax/2) and at the maximum half angle of view (max) is higher than that of the stereographic projection optical system. This indicates that g(θmax/2)<1.0 and g(θmax)<1.0 hold, that is, the resolution of each of the optical systems 100, 200, and 300 according to the first, second, and third exemplary embodiments at the intermediate half angle of view and at the maximum half angle of view is higher than that of the stereographic projection optical system.

Thus, in the optical systems 100, 200, and 300 according to the first, second, and third exemplary embodiments, the resolution at each angle of view is appropriately set. Specifically, the resolution at the intermediate image height and at the outermost off-axis image height is set to be higher than that in the stereographic projection optical system at the risk of decreasing the resolution at the on-axis image height. This configuration makes it possible to achieve a higher resolution in a wide range on the peripheral area than the intermediate image height and to provide the user with an image with high visibility.

The optical systems 100, 200, and 300 according to the first, second, and third exemplary embodiments may desirably satisfy the following inequality (4) for all half angles of view θ that satisfy θmax/2≤θ≤θmax.

$$0.5 < g(\theta) < 1.0 \quad (4)$$

By satisfying the inequality (4), a much higher resolution can be achieved in a wide range from the intermediate image height to the outermost off-axis image height. If the resolution ratio characteristic is more than the upper limit of the inequality (4), the resolution of each of the optical systems 100, 200, and 300 according to the first, second, and third exemplary embodiments is lower than the resolution of the stereographic projection optical system in the range from the intermediate image height to the outermost off-axis image height. This makes it difficult to obtain a sufficiently high-quality image at the peripheral angle of view, and thus this is not preferable. If the resolution ratio characteristic is less than the lower limit of the inequality (4), it is difficult to suitably correct various aberrations such as field curvature in the optical systems 100, 200, and 300 according to the first, second, and third exemplary embodiments, and thus this is not preferable.

Further, the following inequality (4a) may be desirably satisfied, and the following inequality (4b) may be more desirably satisfied.

$$0.60 < g(\theta) < 0.99 \quad (4a)$$

$$0.70 < g(\theta) < 0.98 \quad (4b)$$

In the optical systems 100, 200, and 300 according to the first, second, and third exemplary embodiments, it may be desirable to dispose at least one aspheric lens (lens including an aspherical surface) on the object side of the aperture diaphragm STO. This is because when the lenses are located at positions closer to an object, light beams are more separated from each other than when the lenses are located closer to the image plane IM, and the light beams can be controlled more easily. The aspheric lens only needs to include at least one aspherical surface. If the aspheric lens includes only one aspherical surface, the object-side surface may be desirably an aspherical surface. The aspherical surface may more desirably include a concave surface intersecting with the optical axis AX, and a convex surface located at the peripheral side of the concave surface. Thus, the central area of the aspherical surface and the peripheral area thereof are provided with refractive power (power) of different signs, thereby making it possible to easily set different image-forming magnifications for the central area of the optical system and the peripheral area thereof. That is, the above-described resolution ratio characteristic can be easily achieved.

Figure 8:
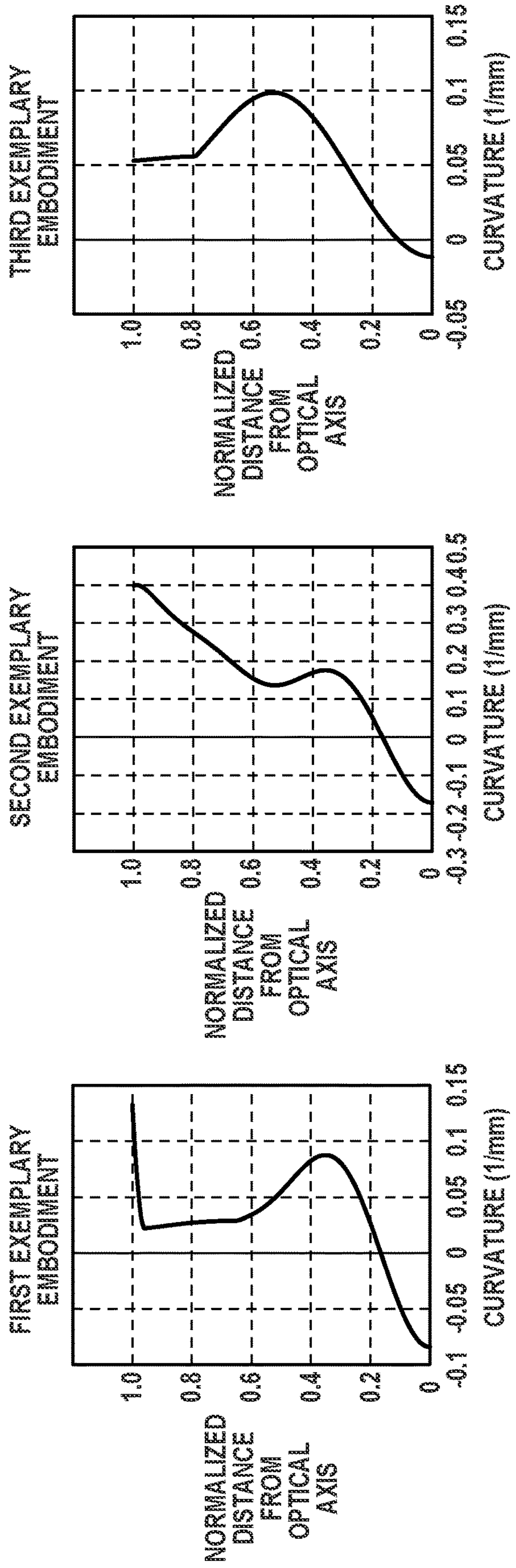
FIG. 8 illustrates a change in curvature of an aspherical surface closest to an object side in the optical systems according to first to third exemplary embodiments.

FIG. 8 illustrates a change in curvature of the aspherical surface closest to the object side in an aspheric lens (first aspheric lens) located on the object side of the aperture diaphragm STO in the optical systems 100, 200, and 300 according to the first, second, and third exemplary embodiments. Specifically, a second lens L12 in the optical system 100 according to the first exemplary embodiment (second lenses L22 and L32 in the optical systems 200 and 300 according to the second and third exemplary embodiments) corresponds to the first aspheric lens. FIG. 8 illustrates the shape of the aspherical surface as the object-side surface (third surface) of the second lens L12. In FIG. 8, the vertical axis represents a normalized distance from the optical axis AX in the radial direction (Y-direction), and the horizontal axis represents the curvature [1/mm] of the aspherical surface. Specifically, FIG. 8 illustrates graphs in which the curvature at each position in the radial direction of the aspherical surface is plotted. The term "normalized distance" used herein refers to the distance from the optical axis AX to each position in an effective area of the aspherical surface when the distance (effective diameter) from the optical axis AX to an end of the effective area of the aspherical surface is normalized to be 1.0.

As illustrated in FIG. 8, the object-side surface of the second lens L12 according to the first exemplary embodiment includes a concave surface (concave shape toward the object side) having negative power on the axis (central portion), and also includes a convex surface (convex shape toward the object side) having positive power at the peripheral side (peripheral portion) of the concave surface. According to this configuration, it is possible to easily achieve the resolution ratio characteristic as described above while suitably correcting the field curvature and effectively adjusting the distortion. The concave surface may be provided on the peripheral side of the convex surface of the aspherical surface, as needed.

The peripheral portion of the aspherical surface on the object side of the first aspheric lens is provided with positive power, thereby making it possible to easily achieve a resolution higher than the resolution of the stereographic projection optical system at the peripheral angle of view. On the other hand, the central portion of the aspherical surface is provided with negative power, thereby making it possible to easily increase the difference in power between the central portion and the peripheral portion. Consequently, it is possible to prevent the absolute value of positive power in the peripheral portion from being excessively increased and prevent various aberrations from being increased as compared with the case where the central portion is provided with positive power.

If the aspherical surface includes a concave surface and a convex surface, i.e., if the sign of power of the aspherical surface is changed from negative to positive in the radial direction, there is a position where the curvature of the aspherical surface is 0. In this case, when the normalized distance of the position where the curvature of the aspherical surface is 0 from the optical axis AX is represented by Dc, the optical systems 100, 200, and 300 according to the first, second, and third exemplary embodiments may desirably satisfy the following inequality (5).

$$0.05 \leq Dc \leq 0.30 \quad (5)$$

The inequality (5) defines an appropriate range of the position (boundary between the concave surface and the convex surface) where the sign of power on the aspherical surface is changed from negative to positive. By satisfying the inequality (5), the focal length of the peripheral area of the optical system can be easily increased. If the inequality (5) is not satisfied, this may not be preferable because it is difficult to appropriately set the image-forming magnification in each of the central area and the peripheral area.

Further, the following inequality (5a) may be desirably satisfied, and the following inequality (5b) may be more desirably satisfied.

$$0.08 \leq Dc \leq 0.25 \quad (5a)$$

$$0.10 \leq Dc \leq 0.20 \quad (5b)$$

Any lens other than the second lens L12 on the object side of the aperture diaphragm STO may be an aspheric lens. Also, in this case, the same advantageous effects can be obtained as long as the aspherical surface is formed in the way described above. However, a first lens L11 located closest to the object side has a large effective diameter, and thus it is highly difficult to process the first lens L11. Therefore, a lens that is located closer to the object side than the first lens L11 and is relatively close to the first lens L11 may desirably include the aspherical surface. Further, since it is more difficult to process the aspheric lens than the spherical lens and the aspheric lens has restrictions on the material and the like, it may be desirable to reduce the number of aspheric lenses as much as possible in terms of easiness of production of the optical system. For this reason, only the second lens second closest to the object side is the aspheric lens on the object side of the aperture diaphragm STO according to each exemplary embodiment.

When the maximum value of the curvature radius of the convex surface is represented by Rmax and the minimum value of the curvature radius of the concave surface is represented by Rmin on the aspherical surface on the object side of the aspheric lens located on the object side of the aperture diaphragm STO, the following inequality (6) may be desirably satisfied.

$$-9.0 < R\max/R\min < -1.0 \quad (6)$$

If Rmax/Rmin is lower than the lower limit of the inequality (6), it may not be desirable because the positive power of the peripheral portion (convex surface) on the aspherical surface becomes extremely large, which may make it difficult to correct the field curvature. On the other hand, if Rmax/Rmin is more than the upper limit of the inequality (6), it may not be desirable because sufficiently large positive power of the peripheral portion on the aspherical surface cannot be obtained, which may make it difficult to achieve a resolution higher than the resolution of the stereographic projection optical system at the peripheral angle of view.

Further, the following inequality (6a) may be desirably satisfied, and the following inequality (6b) may be more desirably satisfied.

$$-8.8 < R\text{max}/R\text{min} < -1.2 \quad (6a)$$

$$-8.6 < R\text{max}/R\text{min} < -1.4 \quad (6b)$$

The paraxial focal length of the aspheric lens on the object side of the aperture diaphragm STO may desirably have a negative sign. This makes it possible to easily correct the field curvature. When the focal length of the optical system is represented by f and the paraxial focal length of the aspheric lens is represented by f2, the following inequality (7) may be desirably satisfied.

$$-5.0 < f2/f < -3.5 \quad (7)$$

If f2/f is less than the lower limit of the inequality (7), it may not be desirable because the absolute value of negative power at the paraxial region of the aspheric lens becomes extremely large, which makes it difficult to correct the field curvature. On the other hand, if f2/f is more than the upper limit of the inequality (7), it may not be desirable because sufficiently large negative power at the paraxial region of the aspheric lens cannot be obtained, which makes it necessary to increase the absolute value of the power of the other negative lenses and makes it difficult to correct a comatic aberration.

Further, the following inequality (7a) may be desirably satisfied, and the following inequality (7b) may be more desirably satisfied.

$$-4.8 < f2/f < -3.6 \quad (7a)$$

$$-4.5 < f2/f < -3.8 \quad (7b)$$

It may be desirable to dispose a negative lens (first negative lens) on the object side of the aspheric lens (first aspheric lens) located on the object side of the aperture diaphragm STO. This configuration makes it possible to correct the field curvature more easily. In this case, a positive lens may be provided between the first negative lens and the first aspheric lens, as needed. To facilitate the aberration correction, the first negative lens and the first aspheric lens may be desirably disposed adjacent to each other. Further, another negative lens may be disposed on the object side of the first negative lens, as needed. To miniaturize a lens unit (front lens group) on the object side of the aperture diaphragm STO, the first lens L11 located closest to the object side may be desirably the first negative lens and the second lens L12 located adjacent to the image side of the first lens L11 may be desirably the first aspheric lens, like in the configuration according to each exemplary embodiment.

It may also be desirable to dispose a negative lens (second negative lens) on the image side of the first aspheric lens. This configuration enables a light beam (off-axis light beam) at the peripheral angle of view to be gradually deflected by the first negative lens, the first aspheric lens, and the second negative lens, thereby easily preventing occurrence of various aberrations such as field curvature. In this case, a positive lens may be disposed between the second negative lens and the first aspheric lens, as needed. To facilitate the aberration correction, the second negative lens and the first aspheric lens may be desirably disposed adjacent to each other. Further, another negative lens may be disposed on the image side of the second negative lens in the front lens group, as needed.

It may also be desirable to dispose an aspheric lens (second aspheric lens) not only on the object side of the aperture diaphragm STO, but also on the image side of the aperture diaphragm STO. This configuration makes it possible to correct various aberrations such as the comatic aberration more easily. This second aspheric lens may be desirably located closest to the image side among the plurality of lenses constituting each optical system. This configuration makes it possible to correct various aberrations such as the comatic aberration more easily. The power of the second aspheric lens is not particularly limited, as long as the power can be set so as to suitably correct various aberrations depending on the configuration of the lens located on the object side of the second aspheric lens.

A lens unit (rear lens group) on the image side of the aperture diaphragm STO may include an aspheric lens other than the second aspheric lens located closest to the image side. However, since it is more difficult to process the aspheric lens than the spherical lens as described above, it may be desirable to reduce the number of aspheric lenses as much as possible in terms of easiness of production of the optical system. For this reason, only the last lens (eighth lens) closest to the image side is the aspheric lens on the image side of the aperture diaphragm STO according to each exemplary embodiment.

In a case where the optical systems 100, 200, and 300 according to the first, second, and third exemplary embodiments each include the first negative lens located on the object side of the first aspheric lens, when the curvature radius of the image-side surface of the first negative lens is represented by R2 and the effective diameter of the image-side surface is represented by h2, each optical system may desirably satisfy the following inequality (8). The term "effective diameter" used herein refers to the maximum diameter of the effective area through which an effective ray that contributes to image formation on the lens surface passes.

$$0.30 < \arcsin(h2/R2)/\theta\ \text{max} < 0.85 \quad (8)$$

If arcsin(h2/R2)/θmax is less than the lower limit of the inequality (8), it may not be desirable because the curvature radius of the image-side surface of the first negative lens becomes extremely large and the first negative lens cannot have sufficiently large negative power, which makes it difficult to correct various aberrations such as the field curvature. On the other hand, if arcsin(h2/R2)/θmax is more than the upper limit of the inequality (8), it may not be desirable because the curvature radius of the image-side surface of the first negative lens becomes extremely small, which makes it more difficult to produce the first negative lens. Particularly, when an antireflection coating film or the like is formed on the image-side surface of the first negative lens, the film performance in the peripheral portion may be insufficient.

Further, the following inequality (8a) may be desirably satisfied, and the following inequality (8b) may be more desirably satisfied.

$$0.40 < \arcsin\left(h2/R2\right)/\theta\ \max < 0.80 \tag{8a}$$

$$0.50 < \arcsin\left(h2/R2\right)/\theta\ \max < 0.78 \tag{8b}$$

The maximum half angle of view θmax of each of the optical systems 100, 200, and 300 according to the first, second, and third exemplary embodiments may desirably satisfy the following inequality (8).

$$80° \leq \theta\ \max \tag{9}$$

By satisfying the inequality (9), the advantages obtained by satisfying the above-described resolution ratio characteristic can be more conspicuous. For example, when the optical systems 100, 200, and 300 according to the first, second, and third exemplary embodiments are applied to an imaging apparatus, such as an in-vehicle camera, each optical system may desirably have a large difference between the resolution in the central area and the resolution in the peripheral area.

Therefore, it may be desirable to satisfy both the resolution ratio characteristic described above and the inequality (9).

Further, the following inequality (9a) may be desirably satisfied, and the following inequality (9b) may be more desirably satisfied.

$$82° \leq \theta\ \max \tag{9a}$$

$$85° \leq \theta\ \max \tag{9b}$$

In this case, in the optical system having such projection characteristic that the resolution in the peripheral area is higher than the resolution in the central area, the focal length in the peripheral area is longer than the focal length in the central area. In this case, if the diameter of a light flux entering the central area and the diameter of a light flux entering the peripheral area are the same (D mm), the value (F-value) of Fno=f/D in the peripheral area is larger than that in the central area. This tendency is more noticeable when the above-described resolution ratio characteristic is satisfied. Accordingly, it may be necessary to obtain brightness (amount of light) in the peripheral area. Therefore, in the optical systems 100, 200, and 300 according to the first, second, and third exemplary embodiments, all effective rays from the optical axis to the maximum half angle of view may be desirably limited only by the aperture diaphragm STO. In other words, each optical system may desirably be configured such that all effective rays that have passed through the aperture of the aperture diaphragm STO reach the image plane without being shielded. This configuration makes it possible to prevent a decrease in the amount of light in the peripheral area.

A detailed configuration of each of the optical systems 100, 200, and 300 according to the first, second, and third exemplary embodiments will be described below.

The optical system 100 according to the first exemplary embodiment illustrated in FIG. 1 will be described below. The optical system 100 according to the first exemplary embodiment includes eight lenses. Specifically, the optical system 100 consists of the first lens L11, the second lens L12, a third lens L13, a fourth lens L14, a fifth lens L15, the aperture diaphragm STO, a sixth lens L16, a seventh lens L17, and an eighth lens L18, which are located in this order from the object side to the image side. A light flux from an object (not illustrated) is focused on the image plane IM through the lenses, the aperture of the aperture diaphragm STO, the optical filter FL, and the cover glass CG, thereby forming an object image. In the optical system 100, all effective rays from the optical axis AX to the maximum half angle of view are limited only by the aperture diaphragm STO. In other words, the optical system 100 does not include any member other than the aperture diaphragm STO that shields the effective rays.

The first lens L11 (first negative lens) located closest to the object side is a meniscus lens (negative meniscus lens) having negative power and including a convex surface as the object-side surface. The second lens L12 (first aspheric lens) is an aspheric lens that is located on the object side of the aperture diaphragm STO, has negative power at an on-axis position (central portion), and has positive power at an off-axis position (peripheral portion). The third lens L13 (second negative lens) is a biconcave lens having negative power. The fourth lens L14 (first positive lens), the fifth lens L15 (second positive lens), and the sixth lens L16 (third positive lens) are biconvex lenses. The seventh lens L17 (third negative lens) is a negative meniscus lens including a convex surface as the image-side surface, and is cemented to the sixth lens L16 to thereby form a cemented lens. The eighth lens L18 (second aspheric lens) located closest to the image side is an aspheric lens located on the image side of the aperture diaphragm STO.

The optical system 100 according to the first exemplary embodiment satisfies the above-described inequalities and can obtain an excellent imaging performance by correcting various aberrations while achieving a high resolution in the range from the intermediate image height to the outermost off-axis image height. Specifically, as illustrated in FIG. 2, in the optical system 100 according to the first exemplary embodiment, the spherical aberration and the field curvature are suitably corrected and the distortion is appropriately set.

The optical system 200 according to the second exemplary embodiment illustrated in FIG. 3 will be described below. Descriptions of the components of the optical system 200 according to the second exemplary embodiment that are similar to those of the optical system 100 according to the first exemplary embodiment described above are omitted.

A first lens L21 (first negative lens) located closest to the object side is a negative meniscus lens including a convex surface as the object-side surface. The second lens L22 is an aspheric lens (first aspheric lens). A third lens L23 (second negative lens) is a biconcave lens. A fourth lens L24 (first positive lens) is a biconvex lens, and is cemented to the third lens L23 to thereby form a cemented lens. A fifth lens L25 (second positive lens) is a meniscus lens (positive meniscus lens) having positive power and including a concave surface as the object-side surface. A sixth lens L26 (third positive lens) is a biconvex lens. A seventh lens L27 (third negative lens) is a negative meniscus lens including a convex surface as the image-side surface, and is cemented to the sixth lens L26 to thereby form a cemented lens. An eighth lens L28 located closest to the image side is an aspheric lens (second aspheric lens).

The optical system 200 according to the second exemplary embodiment satisfies the above-described inequalities and can obtain an excellent imaging performance by correcting various aberrations while achieving a high resolution in the range from the intermediate image height to the outermost off-axis image height. Specifically, as illustrated in FIG. 4, in the optical system 200 according to the second exemplary embodiment, the spherical aberration and the field curvature are suitably corrected and the distortion is appropriately set.

The optical system 300 according to the third exemplary embodiment illustrated in FIG. 5 will be described below. Descriptions of the components of the optical system 300 according to the third exemplary embodiment that are similar to those of the optical system 100 according to the first exemplary embodiment described above are omitted.

A first lens L31 (first negative lens) located closest to the object side is a negative meniscus lens including a convex surface as the object-side surface. The second lens L32 is an aspheric lens (first aspheric lens). A third lens L33 (second negative lens) is a biconcave lens. A fourth lens L34 (first positive lens) is a positive meniscus lens including a convex surface as the object-side surface. A fifth lens L35 (second positive lens) is a biconvex lens. A sixth lens L36 (third negative lens) is a negative meniscus lens including a convex surface as the image-side surface, and is cemented to the sixth lens L36 to thereby form a cemented lens. A seventh lens L37 (third positive lens) is a biconvex lens. An eighth lens L38 located closest to the image side is an aspheric lens (second aspheric lens).

The optical system 300 according to the third exemplary embodiment satisfies the above-described inequalities and can obtain an excellent imaging performance by correcting various aberrations while achieving a high resolution in the range from the intermediate image height to the outermost off-axis image height. Specifically, as illustrated in FIG. 6, in the optical system 300 according to the third exemplary embodiment, the spherical aberration and the field curvature are suitably corrected and the distortion is appropriately set.

First to third numerical examples corresponding to the above-described first to third exemplary embodiments, respectively, will be describe below. In each numerical example, a surface number indicates the order of each optical surface counted from the object surface. Further, r [mm] represents a curvature radius on the optical axis AX of an i-th optical surface, d [mm] represents a distance (distance on the optical axis) between the i-th optical surface and an (i+1)th optical surface, nd represents a refractive index with respect to a d-line of a medium between the i-th surface and the (i+1)th surface, and vd represents the Abbe number based on the d-line of the medium. The Abbe number vd is a value defined by the following expression when the refractive indices with respect to F-line, d-line, and C-line are represented by nF, nd, and nC, respectively.

$$vd=(nd-1)/(\mathrm{nF}-nC)$$

In each numerical example, the surface number of each aspherical surface is followed by asterisk (*). Further, "E±P" in each numerical value indicates "$\times 10^{\pm P}$". In each aspherical surface, the amount of displacement (sagittal amount) from a surface vertex in the optical axis direction is represented by "z", the height from the optical axis AX in the radial direction is represented by "h", the curvature (reciprocal of the curvature radius r) on the optical axis AX is represented by "c", the conic coefficient is represented by "k", and aspherical surface coefficients are represented by A, B, C, D, E, F, G . . . . In this case, the shape of each aspherical surface is expressed by the following equation (aspherical surface equation).

$$z=\frac{ch^2}{1+\sqrt{1-(1+k)c^2h^2}}+Ah^4+Bh^6+Ch^8+Dh^{10}+Eh^{12}+Fh^{14}+Gh^{16}+\ldots \quad (2)$$

Each aspherical surface according to the present exemplary embodiment has a shape that is rotationally symmetric to the optical axis AX as expressed by the aspherical surface equation. The first term in the aspherical surface equation indicates the sagittal amount of a base spherical surface (reference spherical surface) with a curvature radius of R=1/c. The second and subsequent terms indicate the sagittal amount of aspherical surface components added onto the base spherical surface.

The optical systems according to the respective numerical examples are single-focus optical systems in which the focal length is constant (zooming is not performed) and employ a configuration in which focusing is not performed. In other words, the distance between the lenses that constitute the optical systems according to the respective numerical examples is fixed. This configuration prevents the optical performance from being varied along with the movement of each lens. However, each optical system may be configured to perform at least one of zooming and focusing, as needed, and the distance between the lenses may be varied so that the optical system can perform zooming or focusing.

(First Numerical Example)

Surface Data

Surface Number r d nd vd 1 22.696 1.50 1.835 42.7

2 9.477 5.04

3* −11.861 2.90 1.583 59.5

4* 3.098 3.58

35.838 0.80 1.595 67.7

6 4.384 1.20

7 10.737 3.42 1.755 27.5

8 −236.731 0.30

9 5.602 1.80 1.620 36.3

37.553 1.45

11(STO) ∞0.65

12 5.372 3.18 1.618 63.3

13-2.951 0.70 1.893 20.4

14 36.474 0.48

15* 4.390 2.71 1.583 59.5

16* −4.000 0.81

17 ∞0.40 1.560 56.0

18 ∞0.54

19 ∞0.40 1.507 63.0

20 ∞0.15

21(IM)∞0.00

Aspherical Surface Data

Surface Number K A B C 3 0.0000.E+00 4.5396.E−03 −2.0292.E−04 5.8332.E−06

4 −1.1200.E+00 −2.5929.E−03 3.9413.E−03 −8.5153.E−04

15 −3.6226.E−01 −3.6173.E−03 −8.9992.E−05 1.5928.E−04

16 −1.7000.E+01 −9.2721.E−03 2.7771.E−03 −4.1202.E−04

Surface Number D E F G

3 −1.0734.E−07 1.2296.E−09 −8.0105.E−12 2.2752.E−14

49.3641.E−05 −5.7313.E−06 1.8280.E−07 −2.3633.E−09

15 −3.6500.E−05 4.4434.E−06 −3.0099.E−07 8.7919.E−09

16 4.3692.E−05 −1.8684.E−06 −6.6893.E−08 5.4181.E−09

Various Data

Focal Length (mm) 1.00

Fno 2.30

Half Angle of View (deg.) 90.00

Total Length (mm) 32.01

(Second Numerical Example)

Surface Data

Surface Number r d nd vd 1 14.092 0.80 1.852 40.8

2 6.566 2.89

3* −5.810 0.92 1.537 56.1

4* 2.578 2.81

5 −5.082 0.91 1.589 61.1

6 2.888 1.15 2.001 29.1

7 −13.587 0.52

8 −2.838 0.83 1.835 42.7

9 −3.065 0.30

10(STO) ∞0.30

11 5.790 1.49 1.639 55.4

12 −1.838 0.52 1.959 17.5

13 −13.062 0.51

14* 4.719 2.49 1.537 56.1

15* −1.570 0.70

16 ∞0.46 1.540 59.5

17 ∞0.70

18 ∞0.30 1.516 64.1

19 ∞0.10

20(IM)∞0.00

Aspherical Surface Data

Surface Number K A B C

3 −1.48516.E+00 2.30336.E−02 −2.76992.E−03 2.08047.E−04

4 2.37048.E−01 −1.82234.E−02 2.02885.E−02 −5.59580.E−03

14 −3.18377.E−01 −8.64009.E−03 7.69192.E−04 1.52090.E−05

15 −2.04982.E+00 5.87302.E−03 −3.50806.E−03 6.99577.E−04

Surface Numbers D E F G

3 −9.67891.E−06 2.76537.E−07 −4.47807.E−09 3.20116.E−11

4 2.19209.E−04 1.24668.E−04 −1.84263.E−05 7.04500.E−07

14 −1.60138.E−05 0.00000.E+00 0.00000.E+00 0.00000.E+00

15 −5.49922.E−05 0.00000.E+00 0.00000.E+00 0.00000.E+00

Various Data

Focal Length (mm) 0.76

Fno 1.70

Half angle of view (deg.) 90.00

Total Length (mm) 18.69

(Third Numerical Example)

Surface Data

Surface Number r d nd vd 1 20.525 1.50 2.001 29.1

2 8.918 4.42

3* −85.629 2.17 1.583 59.5

4* 2.840 3.79

5 −12.529 0.60 1.589 61.1

6 3.520 0.76

7 4.487 5.10 2.003 19.3

8 30.208 0.42

9(STO)∞0.39

10 5.751 1.84 1.772 49.6

11 −2.105 0.62 1.963 24.1

12 26.215 0.40

13 7.436 2.65 1.589 61.1

14 −5.610 0.40

15* 6.371 2.19 1.583 59.5

16* −8.087 1.00

17 ∞0.40 1.560 56.0

18 ∞0.41

19 ∞0.50 1.507 63.0

20 ∞0.44

21(IM) ∞0.00

Aspherical Surface Data

Surface number K A B C 3 0.00000.E+00 1.44569.E−03 −2.83771.E−05 2.67632.E−07

4 −9.20932.E−01 −4.87825.E−03 9.53604.E−04 −5.73936.E−05

15 0.00000.E+00 1.14740.E−03 −6.05247.E−04 −3.25424.E−06

16 0.00000.E+00 1.62783.E−02 −2.36980.E−03 1.14958.E−04

Surface Numbers D E F G

3 −9.86693.E−10 0.00000.E+00 0.00000.E+00 0.00000.E+00

4 8.49967.E−07 0.00000.E+00 0.00000.E+00 0.00000.E+00

15 −6.30183.E−07 0.00000.E+00 0.00000.E+00 0.00000.E+00

16 −1.30288.E−06 0.00000.E+00 0.00000.E+00 0.00000.E+00

Various Data

Focal Length (mm) 1.01

Fno 2.30

Half Angle of View (deg.) 90.00

Total Length (mm) 30.01

Table 1 below shows values related to the inequalities for the optical systems 100, 200, and 300 according to the first, second, and third exemplary embodiments described above. As indicated in Table 1, the optical systems 100, 200, and 300 according to the first, second, and third exemplary embodiments satisfy the inequalities. It is difficult to show the values g(θ) for all half angles of view θ that satisfy θmax/2≤θ≤ θmax in the inequality (4), and thus the values for the inequality (4) are omitted. However, all of the first to third exemplary embodiments satisfy the inequality (4).

TABLE 1

| | First Exemplary Embodiment | Second Exemplary Embodiment | Third Exemplary Embodiment |
|---|---|---|---|
| Inequality (1) | 1.37 | 1.31 | 1.35 |
| Inequality (2) | 0.95 | 0.93 | 0.98 |

TABLE 1-continued

| | First Exemplary Embodiment | Second Exemplary Embodiment | Third Exemplary Embodiment |
|---|---|---|---|
| Inequality (3) | 0.98 | 0.86 | 0.93 |
| Inequality (5) | 0.17 | 0.17 | 0.11 |
| Inequality (6) | −1.57 | −2.32 | −8.46 |
| Inequality (7) | −3.93 | −4.21 | −4.44 |
| Inequality (8) | 0.71 | 0.73 | 0.75 |
| Inequality (9) | 90 | 90 | 90 |

[Imaging Apparatus]

Figure 9:
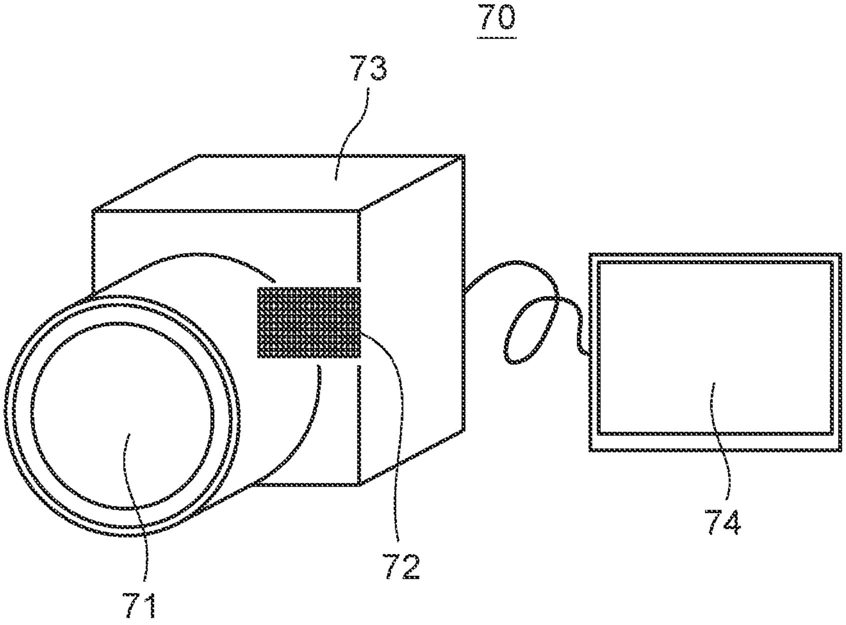
FIG. 9 is a schematic view of an imaging apparatus according to an exemplary embodiment.

FIG. 9 is a schematic view of a principal part of an imaging apparatus 70 according to an exemplary embodiment of the present disclosure. The imaging apparatus 70 according to the present exemplary embodiment includes an optical system (imaging optical system) 71 according to any one of the above-described exemplary embodiments, a light-receiving element 72 that photoelectrically converts an object image formed by the optical system 71, and a camera body (housing) 73 that holds the light-receiving element 72. The optical system 71 is held by a barrel (holding member) and is connected to the camera body 73. As illustrated in FIG. 9, a display unit 74 that displays an image acquired by the light-receiving element 72 may be connected to the camera body 73. An image sensor (photoelectric conversion element), such as a charge-coupled device (CCD) sensor or a complementary metal-oxide semiconductor (CMOS) sensor, can be used as the light-receiving element 72.

If the imaging apparatus 70 is used as a distance measuring device, for example, an image sensor (imaging plane phase difference sensor) including pixels configured to split a light flux from an object into two light beams and to photoelectrically convert the light beams can be adopted as the light-receiving element 72. If a subject is located on the front-side focal plane of the optical system 71, no displacement occurs between the images corresponding to the two split light beams on the image plane of the optical system 71. However, if the subject is located at a position other than the front-side focal plane of the optical system 71, a displacement occurs between the images. In this case, the displacement between the images corresponds to the amount of displacement from the front-side focal plane of the subject. Accordingly, the amount of displacement between the images and the direction of the displacement are acquired using an imaging plane phase difference sensor, thereby making it possible to measure the distance to the subject.

The optical system 71 and the camera body 73 may be attachable to and detachable from each other. In other words, the optical system 71 and the barrel may be configured as an interchangeable lens (lens apparatus). The optical systems 100, 200, and 300 according to the first, second, and third exemplary embodiments described above can be applied not only to imaging apparatuses such as a digital still camera, a camera for silver-halide film, a video camera, an in-vehicle camera, and a monitoring camera, but also to various optical apparatuses such as a telescope, a binocular, a projector (projection apparatus), and a digital copying machine.

[In-Vehicle System]

Figure 10:
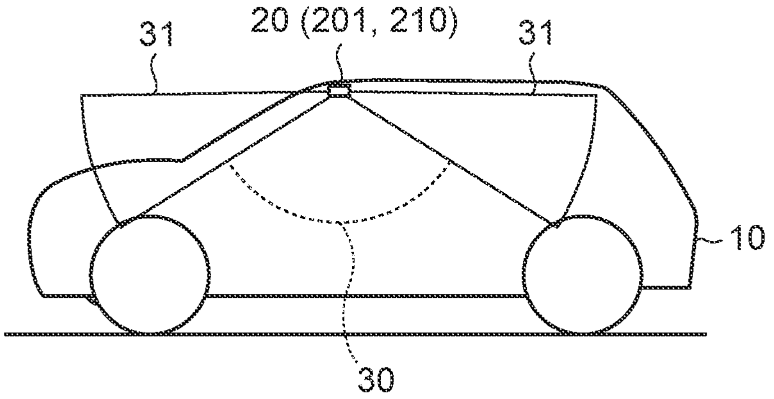
FIG. 10 illustrates a schematic view of a movable apparatus according to an exemplary embodiment and optical characteristics of the optical system.
Figure 10:
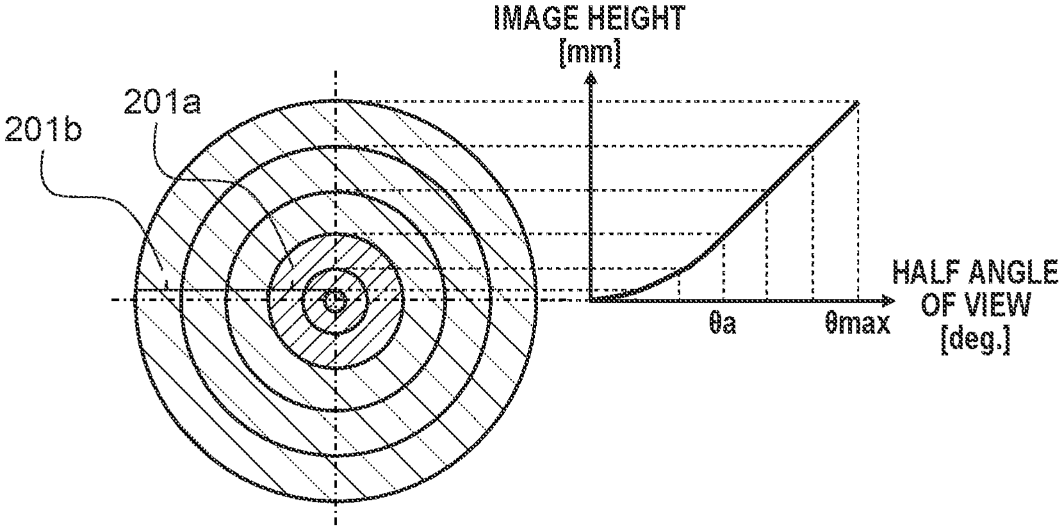

The upper diagram of FIG. 10 is a schematic view illustrating a movable apparatus 10 according to an exemplary embodiment of the present disclosure and an imaging apparatus 20 (in-vehicle camera) held by the movable apparatus 10. The upper figure of FIG. 10 illustrates a case where the movable apparatus 10 is an automobile (vehicle). The movable apparatus 10 includes an in-vehicle system (driving assistance apparatus, imaging system, display system) for assisting a user (such as a driver or passengers) (not illustrated) using an image acquired by the imaging apparatus 20. While, in the present exemplary embodiment, the imaging apparatus 20 is installed on a side of the movable apparatus 10, the imaging apparatus 20 may be installed on the front side, the back side, or any side of the movable apparatus 10. Alternatively, two or more imaging apparatuses 20 may be installed on two or more locations of the movable apparatus 10.

The imaging apparatus 20 includes an optical system 201 according to any one of the above-described exemplary embodiments and an imaging unit 210. The optical system 201 is an optical system (lens with different angles of view) having different image-forming magnifications at a first angle of view (first field of view) 30 and a second angle of view (second field of view) 31 on the peripheral side of the first angle of view 30.

The imaging surface (light-receiving surface) of the imaging unit 210 includes a first area where an image of an object included in the first angle of view 30 is captured, and a second area where an image of an object included in the second angle of view 31 is captured. In this case, the number of pixels per unit angle of view in the second area is larger than the number of pixels per unit angle of view in the first area. In other words, the resolution of the imaging apparatus 20 at the second angle of view (second area) is higher than that at the first angle of view (first area).

Optical characteristics of the optical system 201 will be described in detail below. In the left side in the lower diagram of FIG. 10, an image height y [mm] at each half angle of view θ[deg.] on the imaging plane of the imaging unit 210 is represented by contour lines. The right side in the lower diagram of FIG. 10 is a graph illustrating the relationship (projection characteristics of the optical system 201) between each half angle of view θ and the image height y in the first quadrant of the left diagram.

As illustrated in the lower diagram of FIG. 10, the optical system 201 is configured such that a projection characteristic y(θ) at a half angle of view less than a predetermined half angle of view θa is different from that at a half angle of view more than or equal to the predetermined half angle of view θa. Accordingly, the amount of increase in the image height y (resolution) per unit half angle of view θ varies depending on the angle of view. A local resolution of the optical system 201 is represented by a differential value dy(θ)/dθ with respect to the half angle of view θ of the projection characteristic y(θ). The left side in the lower diagram of FIG. 10 illustrates that the resolution increases as the distance between contour lines of the image height y with respect to each half angle of view θincreases. The right side in the lower diagram of FIG. 10 also illustrates that the resolution increases as the slope of the graph of the projection characteristic y(θ) increases.

On the left side in the lower diagram of FIG. 10, a first area 201*a* that is a central area corresponds to the angle of view less than the half angle of view θa, and a second area 201*b* that is a peripheral area corresponds to the angle of view more than or equal to the half angle of view θa. The angle of view less than the half angle of view θa corresponds to the first angle of view 30 in the upper diagram of FIG. 10, and the angle of view more than or equal to the half angle of view θa corresponds to the second angle of view 31 in the upper diagram of FIG. 10. As described above, the second area 201*b* is an area with high resolution and small distortion, and the first area 201*a* is an area with low resolution and large distortion.

The value θa/θmax of the ratio of the half angle of view θa to the maximum half angle of view θmax may be desirably 0.15 or more and 0.35 or less, and more desirably 0.16 or more and 0.25 or less. For example, since the maximum half angle of view θmax is 90° in each exemplary embodiment described above, the value of the half angle of view θa may be desirably 13.5° or more and 31.5° or less, and more desirably 14.4° or more and 22.5° or less.

The optical system 201 is configured such that the projection characteristic y(θ) is different from 2f tan(θ/2) (stereographic projection method). In this case, the projection characteristic y(θ) of the optical system 201 may desirably satisfy the following inequality (10).

$$0.20 \le 2f\ \tan\left(\theta\ \max/2\right)/y(\theta\ \max) \le 0.95 \qquad (10)$$

In the inequality (10), y(θmax) corresponds to the image height (maximum image height) corresponding to the maximum half angle of view θmax. By satisfying the inequality (10), the resolution in the second area 201*b* can be set to be higher than that in the stereographic projection optical system. If 2f tan(θmax/2)/y(θmax) is more than the upper limit of the inequality (10), it may not be desirable because the resolution in the second area 201*b* decreases and the difference between the resolution in the second area 201*b* and the resolution in the first area 201*a* decreases. If 2f tan(θmax/2)/y(θmax) is less than the lower limit of the inequality (10), it may not be desirable because various aberrations such as the field curvature cannot be suitably corrected.

Further, the following inequality (10a) may be desirably satisfied, and the following inequality (10b) may be more desirably satisfied.

$$0.25 \le 2f\ \tan\left(\theta\ \max/2\right)/y(\theta\ \max) \le 0.94 \qquad (10a)$$

$$0.30 \le 2f\ \tan\left(\theta\ \max/2\right)/y(\theta\ \max) \le 0.80 \qquad (10b)$$

As described above, since the distortion of the optical system 201 is small and the resolution is high in the second area 201*b*, a higher definition image can be obtained than in the first area 201*a*. Therefore, the second area 201*b* (second angle of view 31) is set as an area of interest for the user, thereby obtaining excellent visibility. For example, if the imaging apparatus 20 is located on the side of the movable apparatus 10 as illustrated in the upper diagram of FIG. 10, the image corresponding to the second angle of view 31 can be displayed on a display unit, such as an electronic mirror, thereby making it possible to provide the user with a natural sense of perspective when the user carefully watches an area near the front wheels of the movable apparatus 10, a rear vehicle, or the like. The image corresponding to the first area 201*a* (first angle of view 30) also can be displayed on a display unit, such as an in-vehicle display, thereby making it possible to assist a user's driving.

Figure 11:
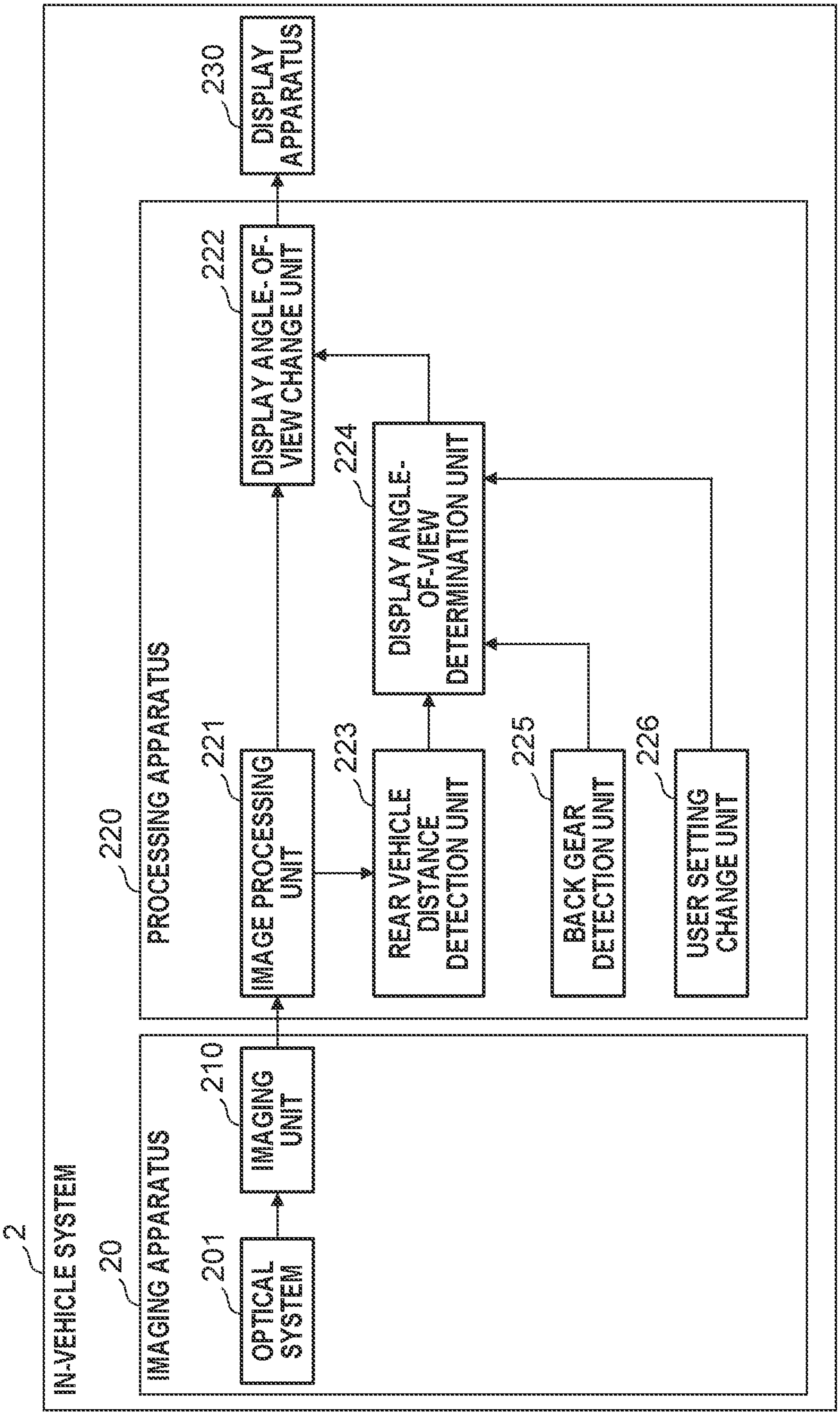
FIG. 11 is a block diagram illustrating a configuration example of an in-vehicle system according to an exemplary embodiment.

FIG. 11 is a functional block diagram illustrating a configuration example of an in-vehicle system 2 according to an exemplary embodiment of the present disclosure. The in-vehicle system 2 is a system for displaying an image obtained by the imaging apparatus 20 installed on the side of the movable apparatus 10 for the user. The in-vehicle system 2 includes the imaging apparatus 20, a processing apparatus 220, and a display apparatus (display unit) 230. The imaging apparatus 20 includes the optical system 201 and the imaging unit 210 as described above. The imaging unit 210 includes an image sensor, such as a CCD sensor or a CMOS sensor. The imaging unit 210 generates captured image data by photoelectrically converting an optical image formed by the optical system 201, and outputs the captured image data to the processing apparatus 220.

The processing apparatus 220 includes an image processing unit 221, a display angle-of-view determination unit 224 (determination unit), a user setting change unit 226 (first change unit), a rear vehicle distance detection unit 223 (first detection unit), a back gear detection unit 225 (second detection unit), and a display angle-of-view change unit 222 (second change unit). The processing apparatus 220 is, for example, a computer such as a central processing unit (CPU) microcomputer (a microcomputer that includes a CPU), and functions as a control unit to control operations of each component based on computer programs. At least one component in the processing apparatus 220 may be implemented by hardware such as an application-specific integrated circuit (ASIC) or a programmable logic array (PLA).

The image processing unit 221 performs image processing, such as wide dynamic range (WDR) correction, gamma correction, Look Up Table (LUT) processing, or distortion correction, on the captured image data acquired from the imaging unit 210, thereby generating image data. The distortion correction is performed on the captured image data corresponding to at least the first area 201*a*. This facilitates the user to visually recognize the image displayed on the display apparatus 230. The distortion correction does not need to be performed on the captured image data corresponding to the second area 201*b*. The image processing unit 221 outputs the image data generated by executing the image processing as described above to the display angle-of-view change unit 222 and the rear vehicle distance detection unit 223.

The rear vehicle distance detection unit 223 acquires information about the distance from the movable apparatus 10 to a rear vehicle included in the image data corresponding to the second angle of view 31 using the image data output from the image processing unit 221. For example, the rear vehicle distance detection unit 223 can detect the rear vehicle based on the image data, and can calculate the distance from the movable apparatus 10 to the rear vehicle based on a change in the position, size, or the like of the detected rear vehicle. The rear vehicle distance detection unit 223 outputs the calculated distance information to the display angle-of-view determination unit 224.

Further, the rear vehicle distance detection unit 223 may determine the vehicle type of the rear vehicle based on data on characteristic information, such as the shape or color of each vehicle type, that is output as a result of machine learning (deep learning) based on images of a large number of vehicles. In this case, the rear vehicle distance detection unit 223 may output information about the vehicle type of the rear vehicle to the display angle-of-view determination unit 224. The back gear detection unit 225 detects whether the transmission of the movable apparatus 10 (own vehicle) has been shifted to the back gear, and outputs the detection result to the display angle-of-view determination unit 224.

The display angle-of-view determination unit 224 determines which one of the first angle of view 30 and the second angle of view 31 is set as the angle of view (display angle-of-view) of the image to be displayed on the display apparatus 230 based on an output from at least one of the rear vehicle distance detection unit 223 and the back gear detection unit 225. Then, the display angle-of-view determination unit 224 outputs information to the display angle-of-view change unit 222 depending on the determination result. For example, if the value of the distance in the distance information is less than or equal to a certain threshold (e.g., 3 m), the display angle-of-view determination unit 224 determines that the first angle of view 30 is set as the display angle-of-view. If the value of the distance is more than the threshold, the display angle-of-view determination unit 224 determines that the second angle of view 31 is set as the display angle-of-view. Alternatively, upon receiving a notification that the transmission of the movable apparatus 10 has been shifted to the back gear from the back gear detection unit 225, the display angle-of-view determination unit 224 can determine that the second angle of view 31 is set as the display angle-of-view. If the transmission of the movable apparatus 10 has not been shifted to the back gear, the display angle-of-view determination unit 224 can determine that the first angle of view 30 is set as the display angle-of-view.

Further, in the state where the transmission of the movable apparatus 10 has been shifted to the back gear, the display angle-of-view determination unit 224 can determine that the second angle of view 31 is set as the display angle-of-view regardless of the detection result from the rear vehicle distance detection unit 223. If the transmission of the movable apparatus 100 has not been shifted to the back gear, the display angle-of-view determination unit 224 can determine that the display angle-of-view is determined depending on the detection result from the rear vehicle distance detection unit 223. Upon receiving vehicle type information from the rear vehicle distance detection unit 223, the display angle-of-view determination unit 224 may change determination criteria for changing the angle of view depending on the vehicle type of the movable apparatus 10. For example, if the movable apparatus 10 is a large vehicle, such as a truck, the braking distance of the movable apparatus 10 is longer than in a case where the movable apparatus 10 is an ordinary vehicle. Accordingly, the above-described threshold may be desirably set to a larger value (e.g., 10 m) than that in a case of an ordinary vehicle.

The user setting change unit 226 causes the user to change the determination criteria for determining whether to change the display angle-of-view to the second angle of view 31 in the display angle-of-view determination unit 224. The determination criteria set (changed) by the user are input to the display angle-of-view determination unit 224 from the user setting change unit 226.

The display angle-of-view change unit 222 generates a display image to be displayed on the display apparatus 230 depending on the determination result from the display angle-of-view determination unit 224. For example, if it is determined that the first angle of view 30 is set, the display angle-of-view change unit 222 cuts out a rectangular narrow-angle image (first image) from the image data corresponding to the first angle of view 30, and outputs the image to the display apparatus 230. If the image data corresponding to the second angle of view 31 includes an image of the rear vehicle that satisfies a predetermined condition, the display angle-of-view change unit 222 outputs an image (second image) including the image of the rear vehicle to the display apparatus 230. The first image may include the image corresponding to the second area 201*b*. The display angle-of-view change unit 222 functions as a display control unit that performs display control for switching between a first display state in which the display apparatus 230 displays the first image and a second display state in which the display apparatus 230 displays the second image.

The processing of cutting out an image by the display angle-of-view change unit 222 is executed by reading a desired image to be cut out from a storage unit (memory), such as a random access memory (RAM), where image data output from the image processing unit 221 is stored. The area corresponding to the second image in the image data is a rectangular area in the first angle of view 30 corresponding to the first area 201*a*. Further, the area corresponding to the second image in the image data is a rectangular area including the image of the rear vehicle in the second angle of view 31 corresponding to the second area 201*b*.

The display apparatus 230 includes a display unit, such as a liquid crystal display or an organic electroluminescence (EL) display, and displays the display image output from the display angle-of-view change unit 222. For example, the display apparatus 230 includes a first display unit as an electronic rear-view mirror located on the upper side of the windshield of the movable apparatus 10, and a second display unit as a control panel (monitor) located on the lower side of the windshield of the movable apparatus 10. According to this configuration, the first image and the second image that are generated based on the image data described above can be displayed on the first display unit and the second display unit, respectively. The first display unit may include, for example, a half mirror, and may be used as a mirror when the first display unit is not used as a display. The second display unit may also function as, for example, a display of a navigation system or an audio system. Instead of performing the processing of cutting out an image by the display angle-of-view change unit 222, the entirety of a combined image of the first angle of view 30 and the second angle of view 31 may be displayed on one display unit.

As described above, in the case where the imaging apparatus 20 is installed on the side of the movable apparatus 10, the imaging apparatus 20 includes the optical system according to any one of the exemplary embodiments described above, and thus high-resolution images of the areas near the front wheels of the movable apparatus 10 and the rear vehicle which the user needs to watch carefully can be acquired by a single imaging apparatus 20. In this case, the display units of the display apparatus 230 may be located at positions corresponding to side mirrors of the movable apparatus 10, and the display units may be used as electronic side mirrors. Further, images acquired by the imaging apparatus 20 installed on the side of the movable apparatus 10 may be displayed on the plurality of display units that are provided on the movable apparatus 10 as described above. In the case where the imaging apparatus 20 is installed on the side of the movable apparatus 10, it may be desirable to dispose the optical system such that the optical axis of the optical system is directed in the horizontal direction or is directed downward (ground side) from the horizontal direction so as to acquire high-resolution images of areas that the user watches carefully as described above. While the upper diagram of FIG. 10 illustrates a case where the optical axis of the optical system is directed downward in the vertical direction, the optical axis may be inclined to the front side or the back side in the vertical direction depending on the direction in which the user wants to watch carefully.

The movable apparatus 10 is not limited to a vehicle, such as an automobile, but instead may be, for example, a movable body such as a ship, an aircraft, an industrial robot, or a drone. The in-vehicle system 2 according to the present exemplary embodiment is used to display images for the user, but instead may be used for cruise control (including cruise control with all vehicle speed following function) and driving assistance such as automatic driving. The in-vehicle system 2 can be applied not only to a movable apparatus, but also to various apparatuses using object recognition, such as an intelligent transportation system (ITS).

Modified Examples

While exemplary embodiments and examples of the present disclosure have been described above, some embodiments are not limited to the above-described exemplary embodiments and examples. Various combinations, alterations, and modifications can be made within the scope of the present disclosure.

For example, the optical systems 100, 200, and 300 according to the first, second, and third exemplary embodiments described above are assumed to be used in the visible range and are configured to perform suitable aberration correction in the entire visible range. However, the wavelength range for aberration correction may be changed, as needed. For example, each optical system may be configured to perform the aberration correction only in a specific wavelength range of the visible range, or may be configured to perform the aberration correction in an infrared wavelength range other than the visible range.

In the in-vehicle system 2 described above, the distance measuring device as described above may be adopted as the imaging apparatus 20. In this case, the in-vehicle system 2 may include a determination unit that determines the possibility of a collision against an object based on information about the distance to the object acquired by the imaging apparatus 20. Alternatively, a stereo camera including two imaging units 210 may be adopted as the imaging apparatus 20. In this case, the synchronized imaging units 210 may simultaneously acquire image data, and the two pieces of image data can be used to perform processing similar to that described above without using the imaging plane phase difference sensor. In this case, the imaging units 210 need not necessarily be synchronized, as long as the difference between the image capturing time of one of the imaging units 210 and the image capturing time of the other of the imaging units 210 is known.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2023-001100, which was filed on Jan. 6, 2023 and which is hereby incorporated by reference herein in its entirety.

What is claimed is:

1. An optical system comprising:

a plurality of lenses; and an aperture diaphragm, wherein when a resolution ratio characteristic g(θ) is defined by the following equation:

$$g(\theta) = \frac{\pi Y(\theta\max)}{360\cdot\tan\left(\frac{\theta\max}{2}\right)\cdot\cos^2\left(\frac{\theta}{2}\right)\cdot\delta Y(\theta)},$$

the following inequalities are satisfied:

1.0<g(0);

g(θmax/2)<1.0; and g(θmax)<1.0.

where θ[deg.] represents a half angle of view, Y[mm] represents an image height at an image plane, Y(θ) represents a projection characteristic of the optical system that represents a relationship between the half angle of view θ and the image height Y δY(δ) represents an amount of change in an image height per unit angle of view, θmax represents a maximum half angle of view.

2. The optical system according to claim 1, wherein the following inequalities are satisfied:

$$1.0 < g(0) < 2.0;$$

$$0.5 < g(\theta\max/2) < 1.0;\text{ and}$$

$$0.5 < g(\theta\max) < 1.0.$$

3. The optical system according to claim 1, wherein the following inequality is satisfied for all half angles of view θsatisfying θmax/2≤θ≤θmax:

$$0.5 < g(\theta) < 1.0.$$

4. The optical system according to claim 1, wherein the plurality of lenses includes a first aspheric lens located on an object side of the aperture diaphragm, and wherein an object-side surface of the first aspheric lens is an aspherical surface including a concave surface intersecting with an optical axis, and a convex surface located on a peripheral side of the concave surface.

5. The optical system according to claim 4, wherein the following inequality is satisfied:

$$0.05 \le Dc \le 0.30,$$

where Dc represents a normalized distance from the optical axis to a position on the aspherical surface where a curvature of the aspherical surface is 0.

6. The optical system according to claim 4, wherein the following inequality is satisfied:

$$-9.0 < R\max/R\min < -1.0,$$

where Rmax represents a minimum value of a curvature radius of the convex surface, and Rmin represents a minimum value of a curvature radius of the concave surface.

7. The optical system according to claim 4, wherein the following inequality is satisfied:

$$-5.0 < f2/f < -3.5,$$

where f represents a focal length of the optical system, and f2 represents a paraxial focal length of the first aspheric lens.

8. The optical system according to claim 4, wherein the plurality of lenses includes a second aspheric lens located on an image side of the aperture diaphragm.

9. The optical system according to claim 8, wherein the second aspheric lens is located closest to the image side among the plurality of lenses.

10. The optical system according to claim 1, wherein the plurality of lenses includes a first aspheric lens located on an object side of the aperture diaphragm, and a first negative lens located on an object side of the first aspheric lens.

11. The optical system according to claim 10, wherein the first negative lens is located adjacent to the first aspheric lens.

12. The optical system according to claim 10, wherein the plurality of lenses includes a second negative lens located on an image side of the first aspheric lens.

13. The optical system according to claim 12, wherein the second negative lens is located adjacent to the first aspheric lens.

14. The optical system according to claim 13, wherein the plurality of lenses includes the first negative lens, the first aspheric lens, the second negative lens, a first positive lens, a second positive lens, the aperture diaphragm, a third positive lens, a third negative lens, and a second aspheric lens located in this order from the object side to an image side.

15. The optical system according to claim 13, wherein the plurality of lenses includes the first negative lens, the first aspheric lens, the second negative lens, a first positive lens, the aperture diaphragm, a second positive lens, a third negative lens, a third positive lens, and a second aspheric lens located in this order from an object side to an image side.

16. The optical system according to claim 10, wherein the following inequality is satisfied:

$$0.30 < \arcsin\left(h2/R2\right)/\theta\ \max < 0.75,$$

where R2 represents a curvature radius of an image-side surface of the first negative lens, and h2 represents an effective diameter of the image-side surface.

17. The optical system according to claim 1, wherein the following inequality is satisfied:

$$0.20 \leq 2f\ \tan\left(\theta\ \max/2\right)/Y(\theta\ \max) \leq 0.95,$$

where f represents a focal length of the optical system.

18. An imaging apparatus comprising:

the optical system according to claim 1; and an image sensor configured to capture an image of an object via the optical system.

19. The imaging apparatus according to claim 18, further comprising:

a display apparatus configured to display an image obtained based on an output from the imaging apparatus.

20. A movable apparatus comprising:

the imaging apparatus according to claim 18; and a movable body configured to move while holding the imaging apparatus.

* * * * *